(12) United States Patent
Ikeda et al.

(10) Patent No.: US 6,625,981 B2
(45) Date of Patent: Sep. 30, 2003

(54) PNEUMATIC BOOSTER AND VACUUM CONTROL VALVE USED THEREFOR

(75) Inventors: Junichi Ikeda, Tokyo (JP); Hiromi Ando, Yamanashi (JP); Atsuya Koshu, Yamanashi (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 10/050,100

(22) Filed: Jan. 18, 2002

(65) Prior Publication Data

US 2002/0109401 A1 Aug. 15, 2002

(30) Foreign Application Priority Data

Jan. 19, 2001 (JP) .......................................... 2001-012460

(51) Int. Cl.[7] .............................................. F16D 31/02
(52) U.S. Cl. ....................................................... 60/397
(58) Field of Search ............................................ 60/397

(56) References Cited

U.S. PATENT DOCUMENTS

| | | | | |
|---|---|---|---|---|
| 1,998,761 A | * | 4/1935 | Hueber et al. ................ | 60/397 |
| 3,754,841 A | | 8/1973 | Grabb et al. ................. | 417/187 |
| 4,380,418 A | * | 4/1983 | Crawford et al. ............. | 60/397 |
| 4,554,786 A | * | 11/1985 | Takeuchi et al. .............. | 60/397 |

OTHER PUBLICATIONS

Patent Abstracts of Japan, by Yoshihisa Miyazaki, entitled "Negative Pressure Source Device for Negative Pressure Booster", Publication No. 62214244, 62214245, Sep. 21, 1987.

Patent Abstracts of Japan, by Hiroo Takeuchi, entitled "Negative–Pressure Source Device of Negative–Pressure Type Booster for Car", Publication No. 60029365, Feb. 14, 1985.

* cited by examiner

Primary Examiner—F. Daniel Lopez
(74) Attorney, Agent, or Firm—Wenderoth, Lind & Ponack, L.L.P.

(57) ABSTRACT

There is disclosed a pneumatic booster having a vacuum chamber connected to an intake pipe of an engine. An air outlet of an ejector is connected to the intake pipe through a vacuum control valve, and an air inlet of the ejector is connected to an air cleaner. A vacuum pick-up port of the ejector is connected to the vacuum chamber of a booster body. The vacuum control valve comprises a control chamber and a control piston, and the negative pressure in the booster is introduced into the control chamber and acts on the control piston. When the negative pressure in the booster is insufficient, the control piston acts to open the control valve and a negative pressure is supplied from the ejector to the vacuum chamber. When the negative pressure in the booster is sufficiently high, the control piston acts to close the control valve and stops the operation of the ejector, thus reducing an effect of the ejector with respect to an air/fuel ratio of the engine.

7 Claims, 6 Drawing Sheets

PNEUMATIC BOOSTER AND VACUUM CONTROL VALVE USED THEREFOR

BACKGROUND OF THE INVENTION

The present invention relates to a pneumatic booster mounted on a brake apparatus for a vehicle such as an automobile, and a vacuum control valve used therefor.

Generally, in a brake apparatus for an automobile, a pneumatic booster is provided so as to increase a braking force. In this pneumatic booster, an intake vacuum of an engine is introduced into a vacuum chamber of the booster, and, due to a differential pressure relative to atmospheric pressure, a thrust force is generated in a power piston provided in the booster, thus increasing a force for operating the brake apparatus.

In a pneumatic booster of this type utilizing an intake vacuum of an engine, in a driving condition where the intake vacuum of the engine is low, for example, immediately after cold start, a sufficiently high negative pressure (level of vacuum) cannot be obtained, thus lowering a servo power. Therefore, proposals have been made to employ a pneumatic booster utilizing an ejector, so as to increase a negative pressure introduced into the vacuum chamber (see Unexamined Japanese Patent Application Public Disclosure Nos. 59-50894 and 60-29366).

However, the above-mentioned conventional pneumatic booster utilizing an ejector has the following problems. Air is always supplied through the ejector to a portion of an intake pipe of an engine downstream of a throttle valve, even when the negative pressure in the vacuum chamber of the booster is high. Therefore, appropriate engine control is impeded by a change in air/fuel ratio. Further, because the ejector is operated utilizing an intake vacuum of the engine, a negative pressure cannot be generated when the engine is stopped, and decreases a servo power.

SUMMARY OF THE INVENTION

In view of the above, the present invention has been made. It is an object of the present invention to provide a pneumatic booster in which an operation of an ejector is appropriately controlled in accordance with a driving condition and a stable negative pressure can be always supplied to a vacuum chamber. It is another object of the present invention to provide a vacuum control valve used for this booster.

In order to solve the above-mentioned problems, the present invention provides a pneumatic booster in which a negative pressure in an intake pipe of an engine is introduced into a vacuum chamber of a booster body, to thereby obtain a servo power. The pneumatic booster comprises an ejector and a control valve. The ejector has an air outlet connected through the control valve to the intake pipe, an air inlet open to the atmosphere and a vacuum pick-up port connected to the vacuum chamber. In response to the negative pressure in the vacuum chamber, the control valve opens when the negative pressure does not reach a predetermined level, and closes when the negative pressure reaches the predetermined level.

With this arrangement, the control valve is open until the negative pressure in the vacuum chamber of the booster body reaches a predetermined level. The ejector is operated as a result of the negative pressure in the intake pipe and a negative pressure is supplied from the vacuum pick-up port into the vacuum chamber. When the negative pressure in the vacuum chamber reaches the predetermined level, the control valve is closed and an operation of the ejector is stopped, and a negative pressure is directly supplied from the intake pipe to the vacuum chamber. Therefore, when the negative pressure in the vacuum chamber is sufficiently high, an operation of the ejector is stopped, thus minimizing an effect of the ejector with respect to an air/fuel ratio of the engine.

The present invention further provides a vacuum control valve which is incorporated into the above-mentioned pneumatic booster and effects the above-mentioned function.

In the pneumatic booster and the vacuum control valve, the ejector includes a nozzle, a diffuser disposed downstream of the nozzle and a suction opening disposed between the nozzle and the diffuser. The nozzle and the diffuser may be formed as a single body.

By this arrangement, it is possible to obtain a compact structure which enables a high negative pressure to be produced from a low negative pressure resulting from the operation of the engine.

DETAILED DESCRIPTION OF THE INVENTION

Figure 9:
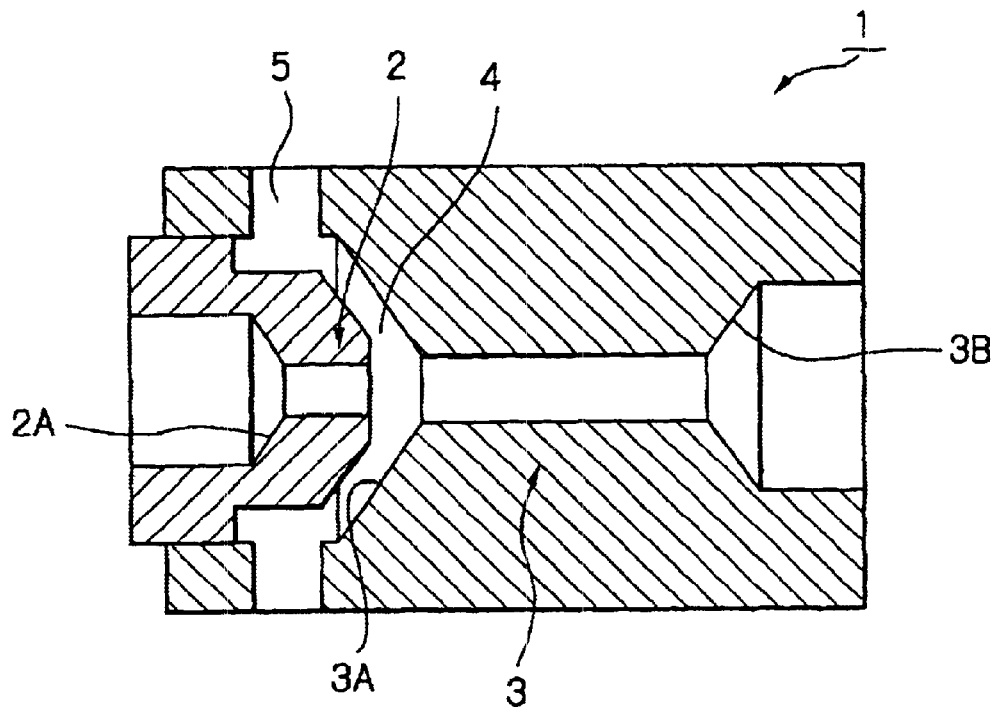
FIG. 9 is a vertical cross-sectional view of a conventional ejector.

In order to facilitate explanation of the present invention, description of a conventional ejector will first be made, with reference to FIG. 9. As shown in FIG. 9, an ejector 1 comprises a straight-tube nozzle 2 having a taper portion 2A formed on the inlet side thereof and a straight-tube diffuser 3 provided on the downstream side of the straight-tube nozzle 2. The straight-tube diffuser 3 has taper portions 3A and 3B formed on the inlet side and the outlet side thereof, respectively. A suction opening 4 is formed between the straight-tube nozzle 2 and the straight-tube diffuser 3, and communicated with a vacuum pick-up port 5. With this arrangement, a gas is caused to flow from the inlet of the nozzle 2 toward the outlet of the diffuser 3, to thereby generate a negative pressure in the suction opening 4. The ejector 1 sucks in a fluid through the vacuum pick-up port 5 due to the effect of this negative pressure.

Figure 10:
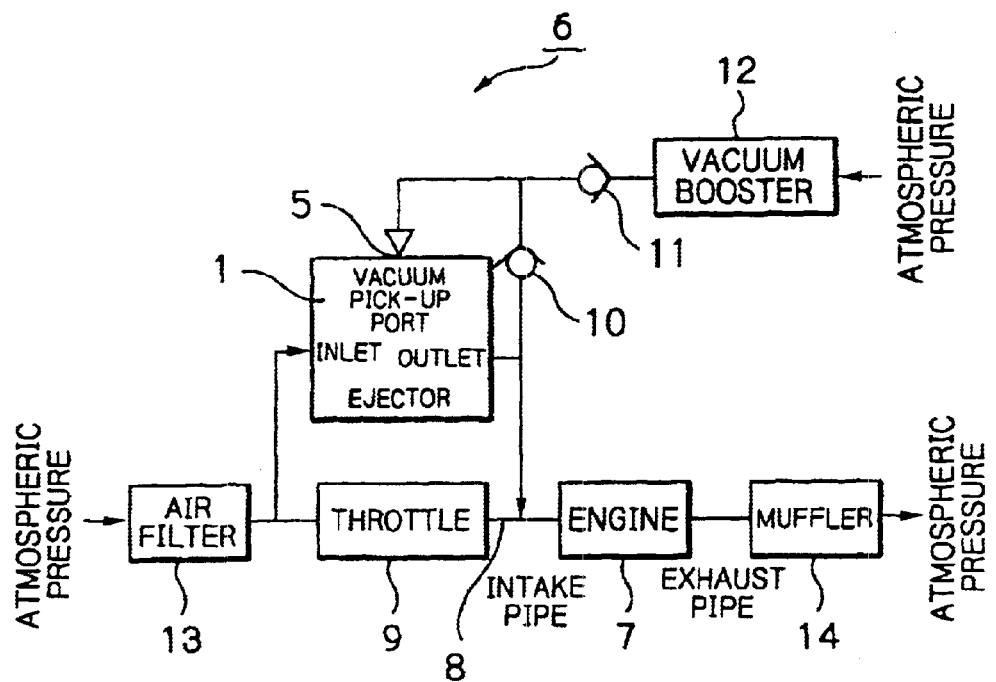
FIG. 10 is a block diagram of a conventional pneumatic booster utilizing the ejector.

Next, referring to FIG. 10, description is made with regard to a conventional pneumatic booster utilizing the ejector 1. As shown in FIG. 10, in a pneumatic booster 6, the outlet of the ejector 1 is connected to a portion of an intake pipe 8 of an engine 7 downstream of a throttle valve 9. A vacuum chamber 12 of a booster body is also connected to the portion of the intake pipe 8 downstream of the throttle valve 9, through check valves 10 and 11. The inlet of the ejector 1 is connected to a portion of the intake pipe upstream of the throttle valve 9, and the vacuum chamber 12 is connected to the vacuum pick-up port 5 of the ejector 1 through the check valve 11. In the drawing, reference numeral 13 denotes an air filter, and reference numeral 14 denotes a muffler.

With this arrangement, when the negative pressure in the intake pipe 8 of the engine 7 is sufficiently higher than the negative pressure in the vacuum chamber 12, the negative pressure in the intake pipe 8 is directly introduced into the vacuum chamber 12 through the check valves 10 and 11. When the negative pressure in the vacuum chamber 12 becomes high and the negative pressure in the intake pipe 8 becomes insufficient, the negative pressure is raised due to a flow of air bypassing the throttle valve 9 through the ejector 1, and introduced from the vacuum pick-up port 5 into the vacuum chamber 12 through the check valve 11. Thus, a high negative pressure can be generated by the ejector 1 and supplied to the vacuum chamber 12, even when the negative pressure in the intake pipe 8 is low.

However, in the above-mentioned pneumatic booster 6 utilizing the conventional ejector 1, air is always supplied to the portion of the intake pipe 8 downstream of the throttle valve 9 through the ejector 1, even when the negative pressure in the vacuum chamber 12 is high. Therefore, appropriate engine control is impeded by a change in air/fuel ratio.

Hereinbelow, embodiments of the present invention are described in detail, with reference to the drawings.

Figure 1:
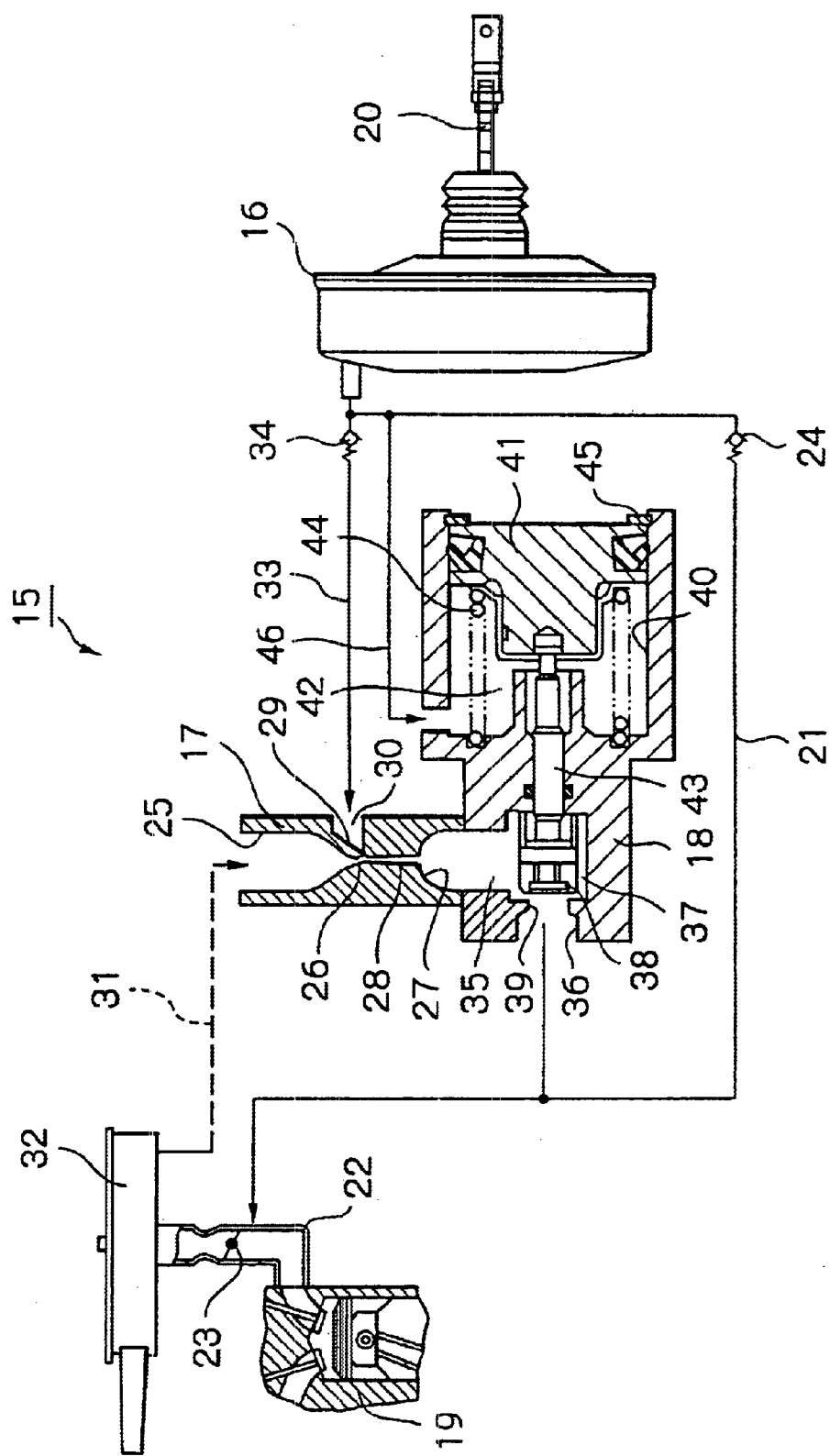
FIG. 1 is a view showing a general arrangement of a pneumatic booster according to a first embodiment of the present invention.

A first embodiment of the present invention is described, with reference to FIGS. 1 to 4. As shown in FIG. 1, a pneumatic booster 15 comprises a booster body 16, an ejector 17 and a control valve 18 provided at an outlet of the ejector 17. A suction system of an engine 19 is used as a source of negative pressure.

The booster body 16 comprises a vacuum chamber and a variable pressure chamber separated by a power piston. In accordance with an input force (a brake operating force) applied to an input rod 20 connected to a brake pedal, air is introduced into the variable pressure chamber. Due to a differential pressure generated between the vacuum chamber and the variable pressure chamber, a thrust force is generated in the power piston and a servo power is imparted to the brake operating force. The vacuum chamber of the booster body 16 is connected through a pipe 21 to a portion of an intake pipe 22 of the engine 19 downstream of a throttle valve 23. A check valve 24 is provided in the pipe 21 so as to prevent a flow of air from the intake pipe 22 to the booster body 16.

The ejector 17 comprises a nozzle 26 provided at an air inlet 25 and a diffuser 28 provided at an air outlet 27. A suction opening 29 is formed between the nozzle 26 and the diffuser 28, and a vacuum pick-up port 30 is communicated with the suction opening 29. By effecting a flow of air from the nozzle 26 at the air inlet 25 to the diffuser 28 at the air outlet 27, a negative pressure is generated in the suction opening 29 and air is sucked in through the vacuum pick-up port 30 due to the effect of this negative pressure.

The air inlet 25 of the ejector 17 is connected through a pipe 31 to an air cleaner 32 attached to an upstream-side portion of the intake pipe 22, and is open to the atmosphere. The air outlet 27 is connected through the control valve 18 to the portion of the intake pipe 22 downstream of the throttle valve 23. Further, the vacuum pick-up port 30 is connected through a pipe 33 to the vacuum chamber of the booster body 16. A check valve 34 is provided in the pipe 33 so as to prevent a flow of air from the vacuum pick-up port 30 to the vacuum chamber of the booster body 16.

The control valve 18 comprises a valve chamber 37 in which an inlet port 35 connected to the air outlet 27 of the ejector 17 and an outlet port 36 connected to the pipe 21 are communicated with each other. A valve body 38 is provided in the valve chamber 37. The valve body 38 is moved away or toward a valve seat 39 formed at the inlet port 35, so as to permit or prevent communication between the inlet port 35 and the outlet port 36.

The control valve 18 further comprises a cylinder 40 and a control piston 41 slidably fitted in the cylinder 40. A control chamber 42 is formed in the cylinder 40 at one end of the control piston 41, and the other end of the control piston 41 is open to the atmosphere. The control piston 41 is connected to the valve body 38 through a connecting rod 43. The control piston 41 is biased toward the atmospheric side thereof by means of a control spring 44 provided in the control chamber 42. Normally, the control piston 41 is located at a retracted position so as to abut against a stopper 45.

When the control piston 41 is located at the retracted position, the valve body 38 is separated from the valve seat 39 so as to permit communication between the inlet port 35 and the outlet port 36. When the control piston 41 moves against spring force of the control spring 44, the valve body 38 is seated on the valve seat 39, to thereby prevent communication between the inlet port 35 and the outlet port 36. When the valve body 38 is seated on the valve seat 39, the negative pressure at the outlet port 36 serves to bias the valve body 38 in a direction for closing the valve.

The control chamber 42 is connected through a pipe 46 to the vacuum chamber of the booster body 16. When the negative pressure in the vacuum chamber does not reach a predetermined level, the negative pressure (level of vacuum) introduced into the control chamber 42 through the pipe 46 is low, and the control piston 41 is moved to the retracted position due to the effect of the spring force of the control spring 44 and the valve body 38 is separated from the valve seat 39. Then, when the negative pressure in the vacuum chamber reaches the predetermined level, due to the effect of the negative pressure introduced into the control chamber 42 through the pipe 46, the control piston 41 moves leftward against the spring force of the control spring 44 and the valve body 38 is seated on the valve seat 39.

Next, an operation of the pneumatic booster in the first embodiment is explained.

The negative pressure in the intake pipe 22 of the engine 19 is introduced through the pipe 21 to the vacuum chamber of the booster body 16. When the negative pressure in the vacuum chamber of the booster body 16 is low, for example, immediately after start-up of the engine 19, the control piston 41 of the control valve 18 is located at the retracted position due to the effect of the spring force of the control spring 44, and the valve body 38 is separated from the valve seat 39 to thereby permit communication between the inlet port 35 and the outlet port 36 (see FIG. 2(a)). In this state, due to the effect of the negative pressure in the intake pipe 22 of the engine 19, a flow of air is effected from the air inlet 25 to the air outlet 27 of the ejector 17 through the pipes 31 and 21, to thereby generate a negative pressure at the suction opening 29. This negative pressure is introduced from the vacuum pick-up port 30 through the pipe 33 into the vacuum chamber of the booster body 16. In this instance, since a high negative pressure is generated at the vacuum pick-up port 30 by the ejector 17, it is possible to supply a high negative pressure to the booster body 16 even when the negative pressure in the intake pipe 22 is low immediately after start-up of the engine 19, thus avoiding the problem of generating an insufficient servo power.

Figure 2A:
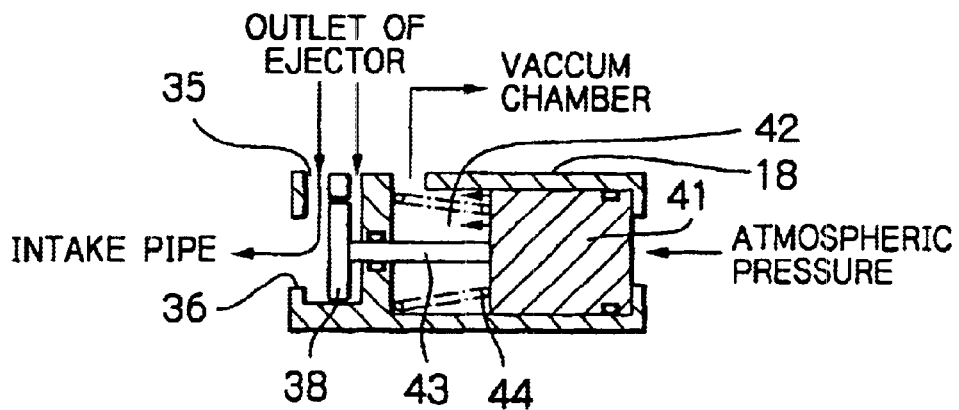
FIGS. 2a–2c are views for explaining an operation of a control valve of the booster of FIG. 1.
Figure 2B:
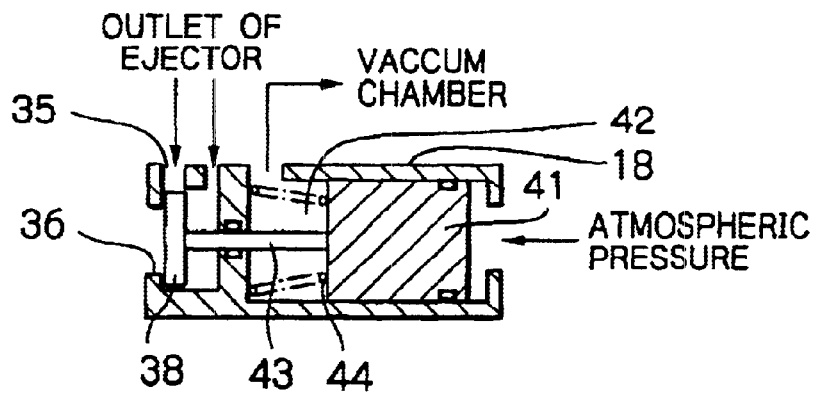
Figure 2C:
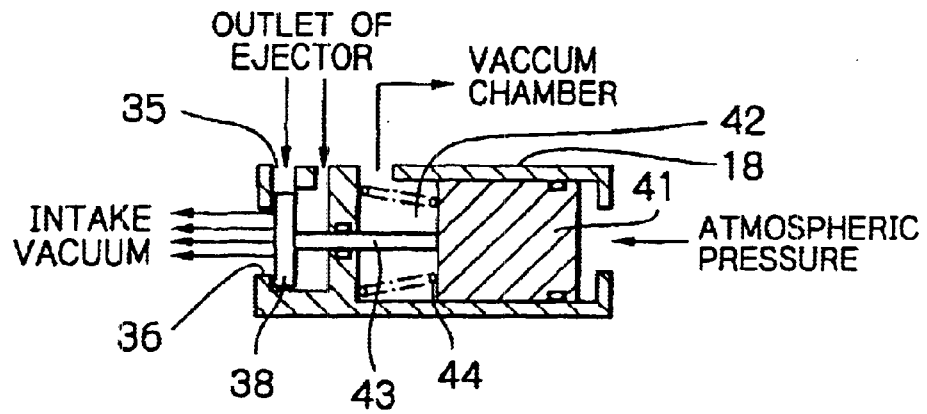

When the negative pressure in the vacuum chamber of the booster body 16 becomes high and reaches a predetermined level, due to the effect of the negative pressure introduced through the pipe 46 into the control chamber 42, the control piston 41 moves leftward against the spring force of the control spring 44 and the valve body 38 is seated on the valve seat 39, to thereby prevent communication between the inlet port 35 and the outlet port 36 (see FIG. 2(b)). Consequently, an operation of the ejector 17 is stopped and the negative pressure is supplied to the booster body 16 only through the pipe 21. Thus, when the negative pressure in the vacuum chamber of the booster body 16 is sufficiently high, an operation of the ejector 17 is stopped, to thereby block the flow of air bypassing the throttle valve 23 through the ejector 17, thus minimizing an effect of the ejector with respect to an air/fuel ratio.

When the negative pressure in the vacuum chamber of the booster body 16 is lowered by operating the brake apparatus, the negative pressure introduced into the control chamber 42 through the pipe 46 lowers, and the control piston 41 is moved rightward due to the effect of the spring force of the control spring 44. When the valve body 38 is seated on the valve seat 39, the negative pressure at the outlet port 36 acts on the valve body 38 in a direction for closing the valve, thus pulling the valve body 38 in a direction for closing the valve due to the effect of the negative pressure in the intake pipe 22. Therefore, the valve body 38 is not separated from the valve seat 39 until the negative pressure in the control chamber 42 becomes lower than a set pressure for closing the valve (see FIG. 2(c)). Thus, after the valve body 38 is closed and the operation of the ejector 17 is stopped, restarting the operation of the ejector 17 due to lowering of the negative pressure in the vacuum chamber can be delayed, thus optimizing the timing of operation of the ejector 17 and minimizing an effect of the ejector with respect to an air/fuel ratio.

It should be noted that in the first embodiment, a cup seal is used as the control piston 41. However, a diaphragm type piston may also be used as the control piston 41.

Figure 3:
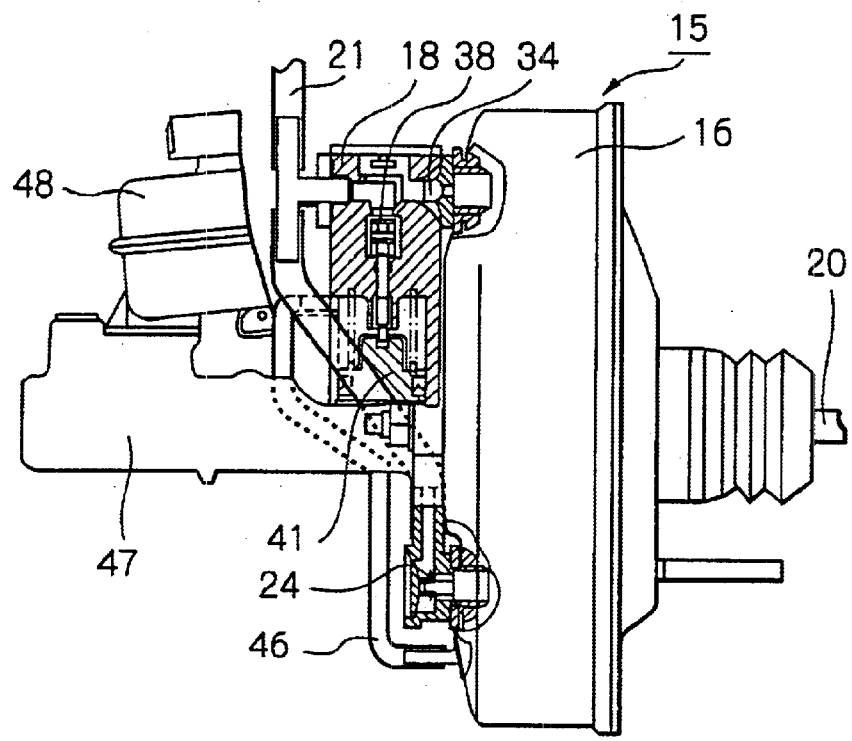
FIG. 3 is a side view of a more specific arrangement of the booster of FIG. 1.
Figure 4:
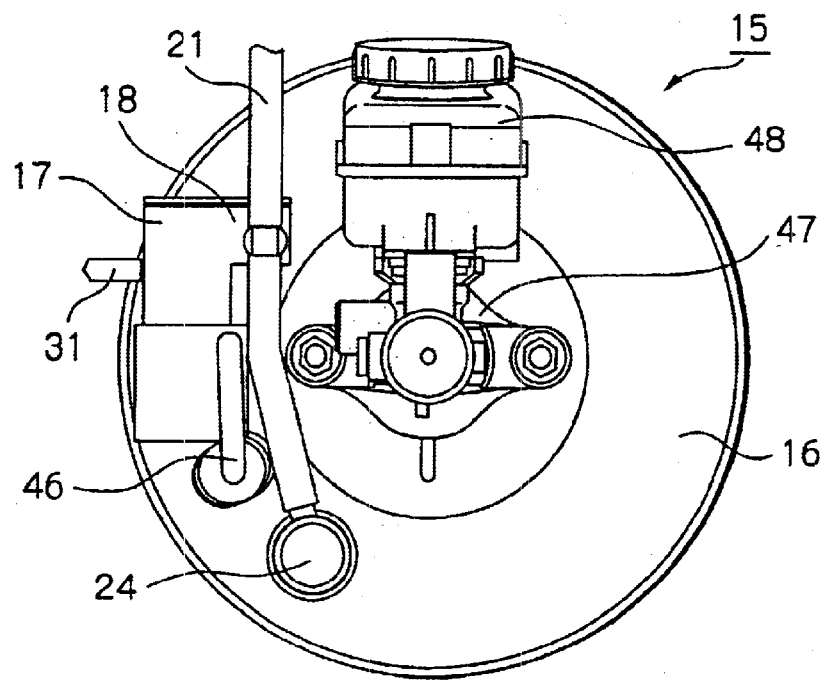
FIG. 4 is a front view of the booster of FIG. 3.

Next, with reference to FIGS. 3 and 4, description is made with regard to an illustration showing a more specific arrangement of the first embodiment. In these drawings, the portions corresponding to those in the first embodiment are designated by the same reference numerals as used in the first embodiment.

As shown in FIGS. 3 and 4, in the pneumatic booster 15 in this embodiment, the ejector 17 and the control valve 18 are provided as a single unit and disposed at a side of a master cylinder 47 attached to the booster body 16. The ejector 17 and the control valve 18 are attached to a front surface of the booster body 16.

In the drawings, reference numeral 48 denotes a reserve tank for a brake fluid used for the master cylinder. With this arrangement, the pneumatic booster 15 can be reduced in size.

Next, referring to FIGS. 5 to 8, description is made on an improved ejector which can be used for the pneumatic booster of the present invention and which is capable of obtaining a high negative pressure.

Figure 5:
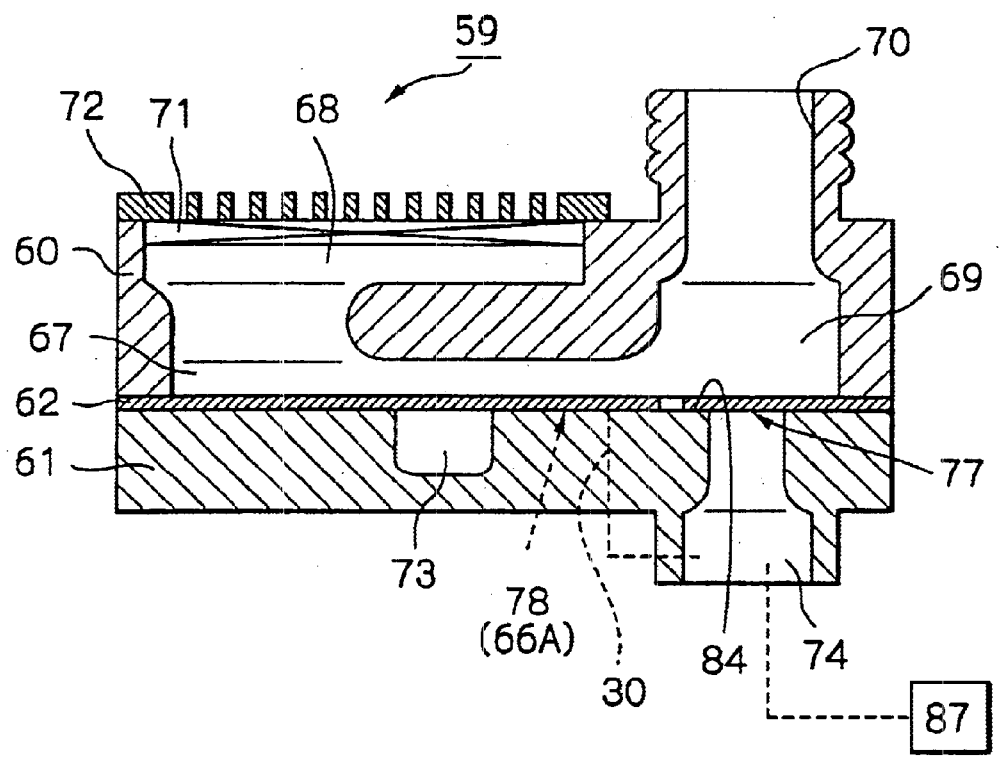
FIG. 5 is a vertical cross-sectional view of an ejector for a pneumatic booster according to a third embodiment of the present invention.
Figure 6:
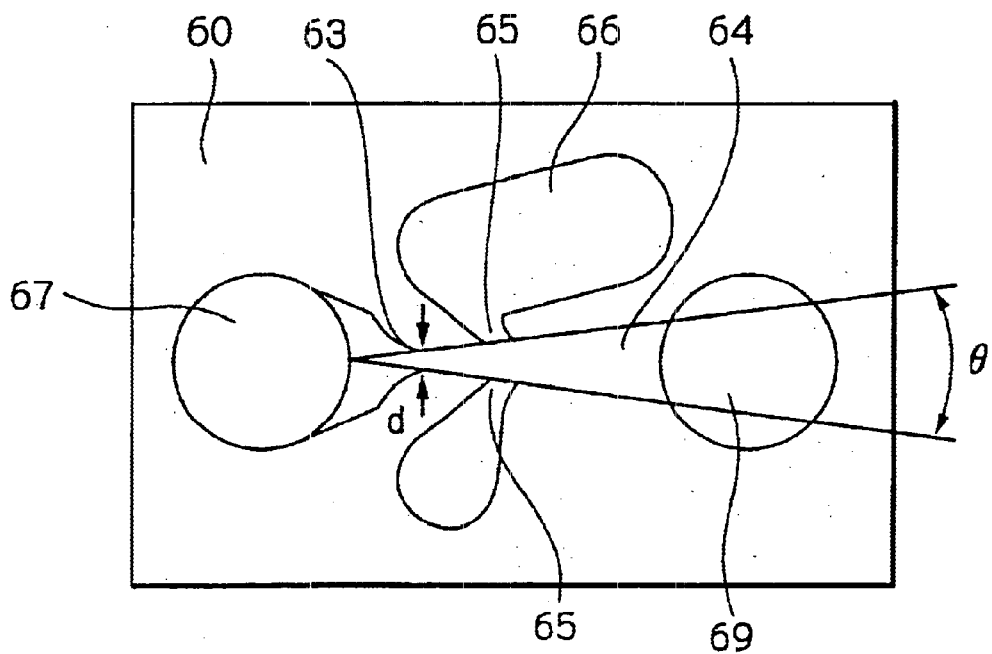
FIG. 6 is a plan view of the bottom of an ejector body of the ejector of FIG. 5, as viewed from the lower side thereof.
Figure 8:
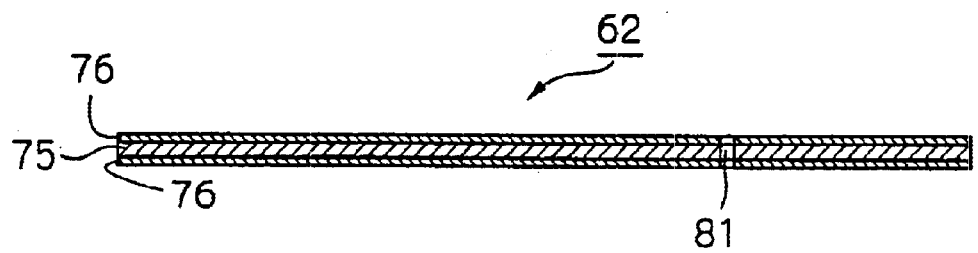
FIG. 8 is a vertical cross-sectional view of the seal plate of the ejector of FIG. 5.

As shown in FIGS. 5 and 8, an ejector 59 comprises an ejector body 60 and a back plate 61 connected to each other into a unitary body with a seal plate 62 being provided therebetween.

A flat connecting surface of the ejector body 60 for connection with the back plate 61 includes a flat-bottomed recess, which forms a nozzle 63, a diffuser 64, a pair of suction openings 65 provided between the nozzle 63 and the diffuser 64 and a vacuum passage 66 communicated with one of the suction openings 65. A back side of the ejector body 60 includes a filter chamber 68 communicated with an inlet 67 of the nozzle 63 and an intake pipe connecting opening 70 communicated with an outlet 69 of the diffuser 64. The ejector body 60 including these elements can be formed as an integral body by injection molding of a synthetic resin. A filter element 71 is attached to an opening of the filter chamber 68 and secured by a porous plate 72.

A connecting surface of the back plate 61 for connection with the ejector body 60 includes a recess forming a communication passage 73 for permitting communication between the suction openings 65. Further, the back plate 61 includes a booster connecting opening 74 communicated with the intake pipe connecting opening 70 through a check valve 77 and a vacuum pick-up port 30 communicated with the vacuum passage 66 and permitting communication between the vacuum passage 66 and the booster connecting opening 74 (with respect to the position of the vacuum pick-up port 30, also see FIG. 1). The back plate 61 including these elements can be formed as an integral body by injection molding of a synthetic resin.

Figure 7:
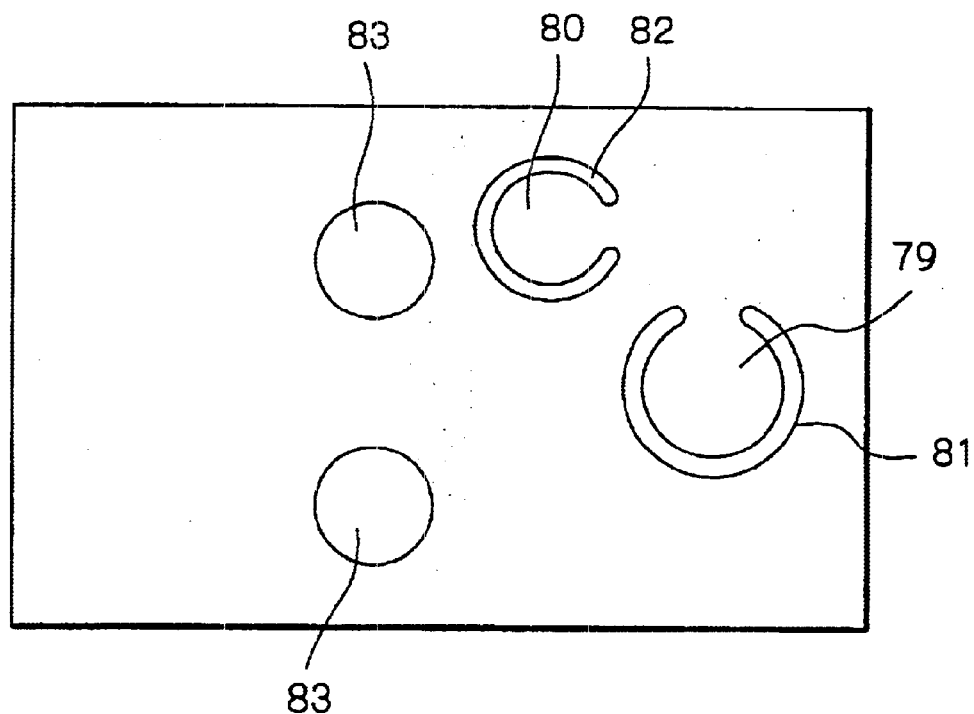
FIG. 7 is a plan view of a seal plate of the ejector of FIG. 5.

As shown in FIGS. 7 and 8, the seal plate 62 comprises a spring member 75 in the form of a thin plate and coverings 76 provided in intimate contact with opposite surfaces of the spring member 75. The covering 76 is made of a thin rubber or soft resin material. The seal plate 62 includes arcuate grooves 81 and 82 for forming disk-like valve bodies 79 and 80 of check valves 77 and 78 provided in the booster connecting opening 74 and the vacuum pick-up port 30. The seal plate 62 also includes a pair of openings 83 formed by punching for permitting communication between the suction openings 65 and the communication passage 73. In the check valve 77, the valve body 79 is seated on a valve seat 84 formed in the back plate 61 so as to permit a flow of air only from the booster connecting opening 74 to the intake pipe connecting opening 70. In the check valve 78, the valve body 80 is seated on a valve seat (not shown) formed in the back plate 61 so as to permit a flow of air only from a vacuum pick-up port 66A to the vacuum passage 66.

Next, an operation of the above-mentioned ejector is described.

When the intake vacuum of the engine is sufficiently higher than the vacuum in a vacuum chamber 87, the intake vacuum is directly introduced into the vacuum chamber 87 through the check valve 77. When the intake vacuum of the engine is insufficient relative to the vacuum in the vacuum chamber 87, air is introduced from an inlet of the ejector due to the effect of the intake vacuum, and flows toward an outlet of the ejector. Due to this flow of air, a high negative pressure is generated at the suction opening, and this negative pressure is introduced into the vacuum chamber 87 through the check valve 78. Thus, even when the intake vacuum of the engine is low, a high negative pressure can be generated by the ejector 59 and introduced into the vacuum chamber 87.

Because the ejector body 60 and the back plate 61 are connected through the seal plate 62, the ejector body 60 and the back plate 61 can be easily produced with high precision by injection molding of a resin. The filter element 71 and the check valves 77 and 78 can be incorporated into the ejector in an integral arrangement so as to reduce the size of the ejector. By using the seal plate 62 in which the coverings 76 made of a thin rubber or soft resin material are provided in intimate contact with opposite surfaces of the spring member, a connecting portion between the ejector body 60 and the back plate 61 can be reliably sealed.

In the above embodiment, the filter element is accommodated in the ejector. However, the filter element may be omitted so that the inlet of the ejector is connected to an air filter of the suction apparatus of the engine.

What is claimed is:

1. A pneumatic booster in which a negative pressure in an intake pipe of an engine is introduced into a vacuum chamber of a booster body, to thereby obtain a servo power, the pneumatic booster comprising an ejector and a control valve, wherein said ejector includes an air outlet connected through the control valve to the intake pipe, an air inlet open to the atmosphere and a vacuum pick-up port connected to the vacuum chamber and said control valve is adapted to open and close in response to the value of the negative pressure in the vacuum chamber relative to atmospheric pressure.

2. A pneumatic booster according to claim 1, wherein the control valve is opened when the negative pressure does not reach a predetermined level, and closed when the negative pressure reaches the predetermined level.

3. A pneumatic booster according to claim 2, wherein the control valve is opened when the negative pressure in the vacuum chamber is lower than a pressure which generates a sufficient servo power, and closed when the negative pressure in the vacuum chamber is the pressure which generates the sufficient servo power.

4. A pneumatic booster according to claim 1, wherein the control valve has hysteresis offset toward valve opening.

5. A pneumatic booster according to claim 1, wherein the ejector includes a nozzle, a diffuser disposed downstream of the nozzle and a suction opening disposed between the nozzle and the diffuser, and the nozzle and the diffuser are formed as a unitary body.

6. A vacuum control valve adapted to be provided in a pneumatic booster in which an ejector is provided between an intake pipe of an engine and a vacuum chamber of a booster body so as to introduce a negative pressure in the intake pipe into the vacuum chamber to obtain a servo power, the control valve comprising a valve portion provided at an air outlet of the ejector which is connected to the intake pipe, a cylinder fluidly isolated from the valve portion and having one end thereof open to the atmosphere and the other end connected to the vacuum chamber, and a control piston provided in the cylinder and connected to the valve portion, said control piston being adapted to open and close the air outlet of the ejector by means of said valve portion, in response to the value of the negative pressure in the vacuum chamber relative to atmospheric pressure.

7. A pneumatic booster according to claim 6, wherein the ejector comprises a nozzle, a diffuser provided downstream of the nozzle and a suction opening disposed between the nozzle and the diffuser, and the nozzle and the diffuser are formed as a unitary body.

* * * * *